June 17, 1969 W. HENN 3,450,897
STEPPING SWITCH EMPLOYING CHAIN OF LOGIC GATES HAVING MEANS FOR LOCKING A GATE IN A GIVEN STATE
Filed June 28, 1966
Sheet 1 of 2

INVENTOR.
WILLIAM HENN
BY
Attorney

INVENTOR.
WILLIAM HENN
BY
Samuel Cohen
Attorney

United States Patent Office 3,450,897

Patented June 17, 1969

3,450,897

STEPPING SWITCH EMPLOYING CHAIN OF LOGIC GATES HAVING MEANS FOR LOCKING A GATE IN A GIVEN STATE

William Henn, Lexington, Mass., assignor to Radio Corporation of America, a corporation of Delaware Filed June 28, 1966, Ser. No. 561,269
Int. Cl. H03k 23/08
U.S. Cl. 307—223 6 Claims This invention relates to a new and improved electronic stepping switch.

A data processing system may include a basic processing unit and a plurality of peripheral units which, from time to time, demand access to the basic processing unit as, for example, when a peripheral unit wishes to transfer information it is storing to the main memory of the data processing machine. In one particular machine, the peripheral units are arranged in groups which have different priorities. If demands for access or "service" occur simultaneously, say from two groups of peripheral units assigned different priorities, priority circuits associated with the basic processing unit will grant access to the group of peripheral units having the higher priority status. Priority circuits are well-known and are not the subject of the present invention.

Within each group of peripheral units, it is desired in one particular system, that if more than one such unit demands access to the basic processing unit during the time the group is in communication with the basic processing unit, they be granted access in some predetermined order. This invention is concerned with an improved circuit for permitting this type of operation.

The circuit of the invention includes an oscillator circuit formed of a chain of logic gates arranged in a ring. When a request for service is received, a signal is applied to a particular one of the gates for locking that gate in a given state to prevent the flow of signals from logic gate to logic gate. The output of the gate locked in a given state, the output of a second gate in the chain and a third signal from which the locking signal is derived, are employed to actuate an output logic gate for indicating that the unit requesting it will be serviced. The circuit includes means for preventing subsequent requests for service received during a servicing interval from affecting the circuit operation. Means may be provided for storing such subsequent requests. In this case, upon termination of the processing interval, these subsequent requests are acted on in a predetermined order in the same manner as the first received such request.

The invention is discussed in greater detail below and is shown in the following drawings of which:

FIGURES 1*a*, 1*b* and 1*c* are schematic diagrams of the drawing conventions employed in the other figures;

Figure 1A:
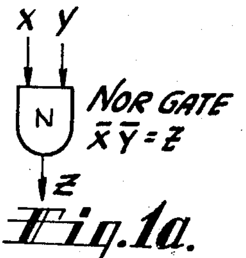
Figure 1B:
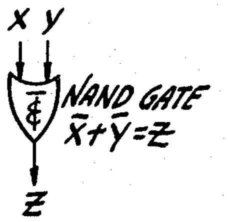
Figure 1C:
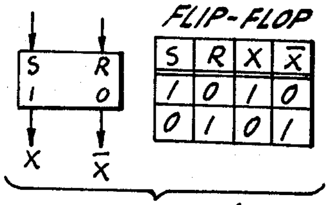

FIGURES 1*a*–1*c* are more or less self-explanatory. The truth table for the NOR and NAND gates is:

| X | Y | Z (NOR) | Z (NAND) |
|---|---|---|---|
| 0 | 0 | 1 | 1 |
| 0 | 1 | 0 | 1 |
| 1 | 0 | 0 | 1 |
| 1 | 1 | 0 | 0 |

For purposes of the present explanation, the convention is adopted that a signal at a relatively low level, such as ground, represents the binary digit (bit) 1 and a signal at a relatively high level, such as +V volts, represents the binary digit 0. To simplify the discussion, a signal representing the binary digit 1 or 0 is sometimes referred to hereafter as a 1 or a 0, respectively.

Figures 2, 3:
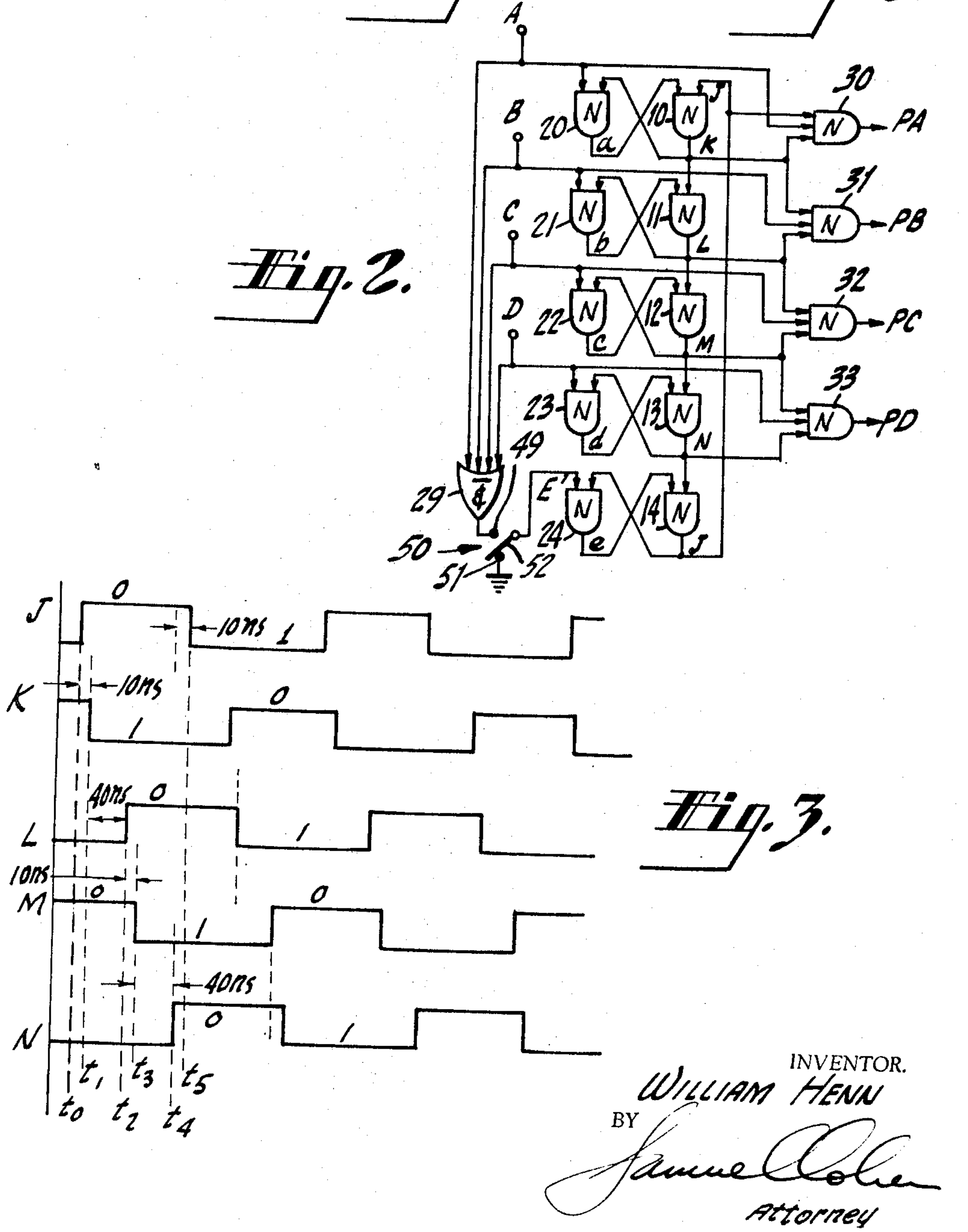
FIGURE 2 is a block circuit diagram of one form of stepping switch according to the invention.
FIGURE 3 is a drawing of waveforms present in the circuit of FIGURE 2.

The circuit of FIGURE 2 includes a group of five NOR gates 10–14 interconnected in a chain. The output of each of gates 10–13 is fed to the following NOR gate and the output of NOR gate 14 is fed back as an input to NOR gate 10. In mathematical terms, the output of each $i$'th NOR gate is applied as one input to the $$i \underset{5}{\oplus} 1\text{'th NOR gate}$$

where $$\underset{5}{\oplus}$$

represents sum modulo 5 addition. The circuit includes, in addition, five NOR gates 20–24, cross-connected with NOR gates 10–14, respectively. In other words, the output of a NOR gate such as 20 serves as one input to its corresponding NOR gate 10 and the output of NOR gate 10 serves as an input to its corresponding NOR gate 20.

The NOR gates 20–23 receive input signals A–D, respectively. These signals are also applied to a NAND gate 29. The output of the NAND gate is shown connected to one terminal 49 of switch 50. (In practice, the switch need not be included, however, it is shown for purposes of the explanation which follows.) A second terminal 51 of switch 50 is connected to ground representing a 1. The arm 52 of the switch is connected to one input terminal of NOR gate 24.

The circuit of FIGURE 2 also includes four output NOR gates 30–33. Each such NOR gate receives three inputs. One such input is from one of NOR gates 10–14. The second such input is from a second of the NOR gates 10–14. The third input is an input signal to the circuit. For example, NOR gate 30 receives the input signal A; NOR gate 31 the input signal B and so on.

In mathematical terms, the circuit of FIGURE 2 has an odd number $n$ of gates in the chain of gates (there are 5 such gates 10–14 in the example given) and an even number $n$-1 of output gates. Each $i$'th output gate receives a signal from the $i$'th gate in the chain, the $$i \underset{n}{\ominus} 1\text{'th gate}$$

in the chain and a third signal (one of A . . . D), where $$\underset{n}{\ominus}$$

represents modulo $n$ subtraction. For example, the first gate 30 receives a signal from the first gate 10 in the chain, the fifth gate 14 in the chain, and the A signal, where, in this example $i$=1 and $$i \underset{5}{\ominus} 1\text{'th}=5$$

The input signals A, B, C and D come from the peripheral units (not shown) which, for the sake of convenience, also are identified by the letters A, B, C and D, respectively. When a peripheral unit does not require servicing by the basic processing unit, its output signal has the value 1. When a peripheral unit desires access to the basic processing unit, its output signal changes to 0. For example, when peripheral unit C demands access, the signal C changes from 1 to 0. If the circuit of FIGURE 2 grants access to a particular peripheral unit, the output of one of the output gates 30–33 changes from a 0 to 1, as will be shown shortly.

In the operation of the circuit of FIGURE 2, the signals A, B, C and D normally have the value 1. This causes the outputs *a*, *b*, *c* and *d* or gates 20, 21, 22 and 23, respectively, all to have the value 0. Assume that the switch 50 is in the position shown so that the signal E also has the value 1, whereby NOR gate 24 is inactive, and *e* is a 0.

With the conditions as given above, the NOR gate chain 10–14 oscillates. Assume that J initially is a 1 and at time $t_0$, J changes to 0, all as shown in FIGURE 3. Both inputs *a* and J to gate 10 are 0 so that K becomes a 1. This occurs at time $t_1$, which, in one practical circuit, is 10 nanoseconds after $t_0$. In this practical circuit, the gates employed require 10 nanoseconds after all inputs to the gate are 0 to produce a 1 output. These same gates require 40 nanoseconds after one input changes to a 1 to produce a 0 output.

As mentioned above, at time $t_1$, K changes to 1. Forty nanoseconds thereafter, L changes to 0. Ten nanoseconds later M, the output or NOR gate 12, changes to 1. Forty nanoseconds later N, the output of NOR gate 13, changes to 0. This occurs at time $t_4$ in FIGURE 3. Ten nanoseconds later J, the input to NOR gate 10, changes back to 1 and the chain is in an oscillating condition as is clear from FIGURE 3.

In a practical circuit, the switch 50 may be omitted and terminal 49 directly connected to NOR gate 24. This means that when A, B, C and D are all 1 (none of the peripheral units is requesting service) E is a 0. Now, when J becomes 0, during the cycling of the oscillator, *e* becomes 1 and J is locked to the value 0. The oscillations then cease (at $K=1$, $L=0$, $M=1$, $N=0$, $J=0$ so that the circuit rests. (The only reason this is done is to prevent possible noise due to continuous high frequency oscillations.) However, as soon as one of the peripheral units requests service, one of A, B, C and D changes to 0, and E therefore becomes 1. This changes *e* to 0 and J to 1 (since N and *e*, the two inputs to gate 14 are 0) and the oscillations start again.

Assume now that a request for service arrives from peripheral unit B. This is manifested as a change in the value of signal B from 1 to 0 (and E changes to 1). If L initially is a 0 as it is, both inputs to NOR gate 21 are 0 so that *b* "immediately" changes to 1. This signal b=1 locks NOR gate 11 in a state such that it continuously produces an output L=0. Accordingly, even when K changes to 0 as a result of J changing to 1, this does not affect NOR gate 11. It is clear that a short time after any one of the NOR gates in the chain 10–14 is locked in a given state, oscillations cease.

The signal L initially is a 0, $M=1$, $N=0$ and $J=0$. When E changes to 1, then J becomes 1, then K becomes 0. Thereafter, all oscillations cease. At this time, $K=0$, $L=0$ and $B=0$. Therefore, all three inputs to NOR gate 31 are 0 and PB changes from 0 to 1. Thus, peripheral unit B is signaled that it is granted access to the basic processing unit.

Assuming now that during the time the signal $B=0$ is present, one of the other signals, such as A, changes to 0. This does not affect the circuit operation. The signal K is a 0 and the signal A is a 0 so that two of the three inputs to NOR gate 30 are 0. However, the signal J is a 1 when K is a 0 so that NOR gate 30 remains disabled.

In a manner similar to the above, if C changes to 0 during the time L is a 0 and PB is a 1, gate 32 does not become enabled. This is because even though L and C, two of the inputs to NOR gate 32, are 0, the third input to the NOR gate, namely M, is a 1.

If during the time a signal such as $A=0$ is present, B changes from 0 back to 1, NOR gate 31 becomes disabled and PB changes back to 0. When B changes to 1, *b* changes to 0. K is 0 so that L changes to 1, then M changes to 0, then N changes to 1, then J changes to 0. All three inputs to NOR gate 30, namely J, A and K, are now 0 so that PA changes to 1.

Figure 4:
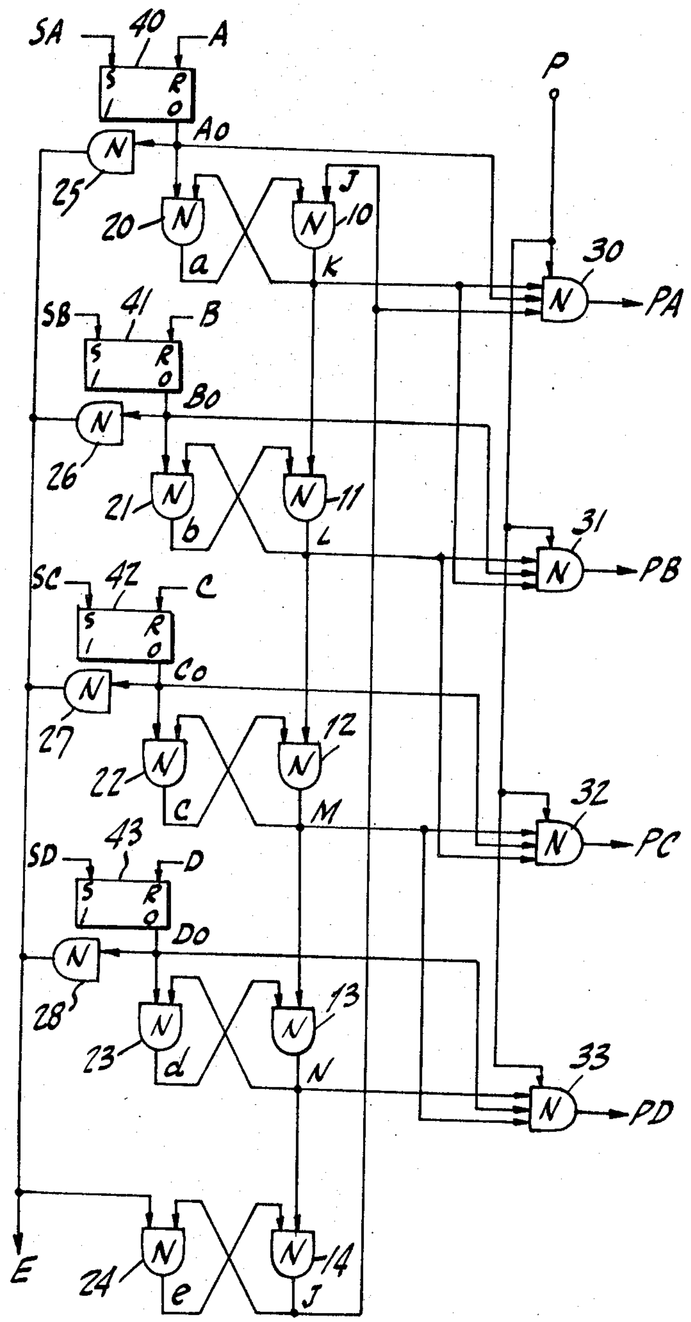
FIGURE 4 is a block circuit diagram of an improved form of the invention.

An improved circuit according to the invention is shown in FIGURE 4. It includes all of the elements of FIGURE 2 (however, four NOR gates 25–28 connected to a common lead, the latter simulating the OR function, are employed rather than the single NAND gate 29) and, in addition, four temporary storage devices, namely flip-flops 40–43. (The NOR gates 25–28, connected as shown, are logically equivalent to the NAND gate of FIGURE 2. Each one input NOR gate is also the logical equivalent of an inverter.) When a peripheral unit such as unit A is inactive $A=1$, and flip-flop 40 is reset. When all four flip-flops 40–43 are reset (no peripheral unit requesting service) the NOR gates 20–23 are disabled just as in the circuit of FIGURE 2. Also, NOR gates 25–28 are disabled so that $E=0$ and the oscillator is at rest. When a peripheral unit, such as A, desires access to the basic processing unit, its output signals SA and A change to 1 and 0, respectively, and its flip-flop 40 becomes set.

The NOR gates 30–33 include the same inputs as the corresponding NOR gates of the circuit of FIGURE 2, and in addition, receive a fourth input P. P is a signal from the priority circuit (not shown) which indicates whether the group of peripheral units A–D have priority. If they do have priority, $P=0$. If some other group of peripheral units (not shown) is interacting with the basic processing unit and previously has been granted priority, then $P=1$ and gates 30–33 are maintained in a disabled condition.

The operation of the circuit of FIGURE 4 is quite analogous to that of the circuit of FIGURE 2. However, the circuit of FIGURE 4 has the additional feature of storage. If, for example, $SC=1$ and $C=0$ so that NOR gate 32 is enabled and $PC=1$, and during the interval when $PC=1$, signals $SD=1$, $D=0$ arrive, these will be temporarily stored in flip-flop 43. After the peripheral unit C completes its interaction with the basic processing unit, C will change back to 1 and SC to 0 so that flip-flop 42 will become reset. NOR gate 32 thereupon becomes disabled and PC changes back to 0. The chain now begins to cycle. The *c* output of NOR gate 22 is a 0 and $L=0$ so that M changes to 1. N thereupon changes to 0 and *d* becomes 1. This locks NOR gate 13 in a disabled condition so that N remains a 0. The following changes then occur, in sequence: $J=1$, $K=0$, $L=1$, $M=0$. When M changes to 0, the four inputs to NOR gate 33, namely N, M, DO, and P$\sqrt{}$ are 0 and NOR gate 33 becomes disabled.

After peripheral unit D completes its interaction with the basic processing unit, D changes back to 1 and SD to 0 resetting flip-flop 43. The circuit again begins to cycle until a new request for access is received.

The circuit of FIGURE 4 is capable of storing up to four requests for service (all flip-flops set). The priority sequence, starting at the rest position, is B, D, A, C, in that order, as should be clear from FIGURE 3. Note that in this figure the positive portions of the respective cycles, representing 0's, occur in the following sequence J, L, N, K, M, J, L, etc. Thus, for example, if the C peripheral unit is presently being granted access to the basic processing unit, and registers 43 and 41 are storing requests for service from units D and B, respectively, when unit C is finished, priority will be granted first to B, then to D.

Any time one of the four peripheral units A–D is in communication with the basic processing unit, one of the four flip-flops 40–43 is set. This causes one of the NOR gates 25–28 to become enabled and E to change from 0 to 1. On the other hand, when none of the peripheral units A–D is requesting access to the basic processing unit, $AO=BO=CO=DO=1$, all of the NOR gates 25–28 are disabled and $E=0$. The E signal therefore can be fed back to the priority circuit or to the basic processing unit to indicate whether or not any one of the four peripheral units A–D is being serviced by the basic processing unit.

While the circuit has been shown to consist of NOR gates, it should be clear to persons skilled in this art, that other gates may be used instead. As one example, the circuit may be implemented with NAND gates provided the conventions are changed appropriately.

What is claimed is:

1. In combination:

a chain of logic gates interconnected in a ring and capable of producing oscillations;

means for applying a disabling signal to one gate for locking that gate in a given state and thereby preventing said oscillations; and an output gate connected to said chain and to said means and normally producing an output representing one binary value, receptive of a signal complementary to said disabling signal, the signal produced by the gate locked in said given state and the signal produced by a second gate in said chain for producing an output representing the other binary value when the three signals it receives are of the same value.

2. In the combination set forth in claim 1, said logic gates and said output gates all comprising NOR gates.

3. The combination as set forth in claim 1, further including a plurality of logic gates equal in number to the logic gates in said chain, each cross-connected with a corresponding logic gate in said chain.

4. In combination:

a chain of $n$ two input logic gates, the output of each $i$'th gate serving as the first input to the $$i \underset{n}{\oplus} 1\text{'th gate}$$

where $n$ is an odd integer, $i$ represents any one of the gates, and $$\underset{n}{\oplus}$$

represents modulo $n$ addition;

means for applying respective signals to the second input to each gate, each signal for priming a gate when the signal has one binary value and for disabling the gate when the signal has the other binary value, whereby when said $n+1$ logic gates are all primed, they produce oscillations;

$n-1$ output logic gates; and means for applying to each $i$'th output gate, the output signals of the $i$'th and the $$i \underset{n}{\ominus} 1\text{'th logic gates}$$

in the chain, and a third signal which is complementary to the signal applied to the second input to the $i$'th logic gate, where $$\underset{n}{\ominus}$$

represents modulo $n$ subtraction.

5. The combination set forth in claim 4, wherein all of said logic gates comprise NOR gates.

6. The combination set forth in claim 4, further including means connected to all of said output logic gates for applying an inhibit signal to all of said gates.

References Cited

UNITED STATES PATENTS

| | | | |
|---|---|---|---|
| 3,054,059 | 9/1962 | Ingerman | 307—223 XR |
| 3,260,861 | 7/1966 | Dalley | 307—224 |
| 3,275,848 | 9/1966 | Bell | 328—93 XR |

ARTHUR GAUSS, *Primary Examiner.*

JOHN ZAZWORSKY, *Assistant Examiner.*

U.S. Cl. X.R.

307—215, 217; 328—75, 93, 97